3,751,382
ENZYMATIC INDICATOR AND METHOD OF MAKING IT

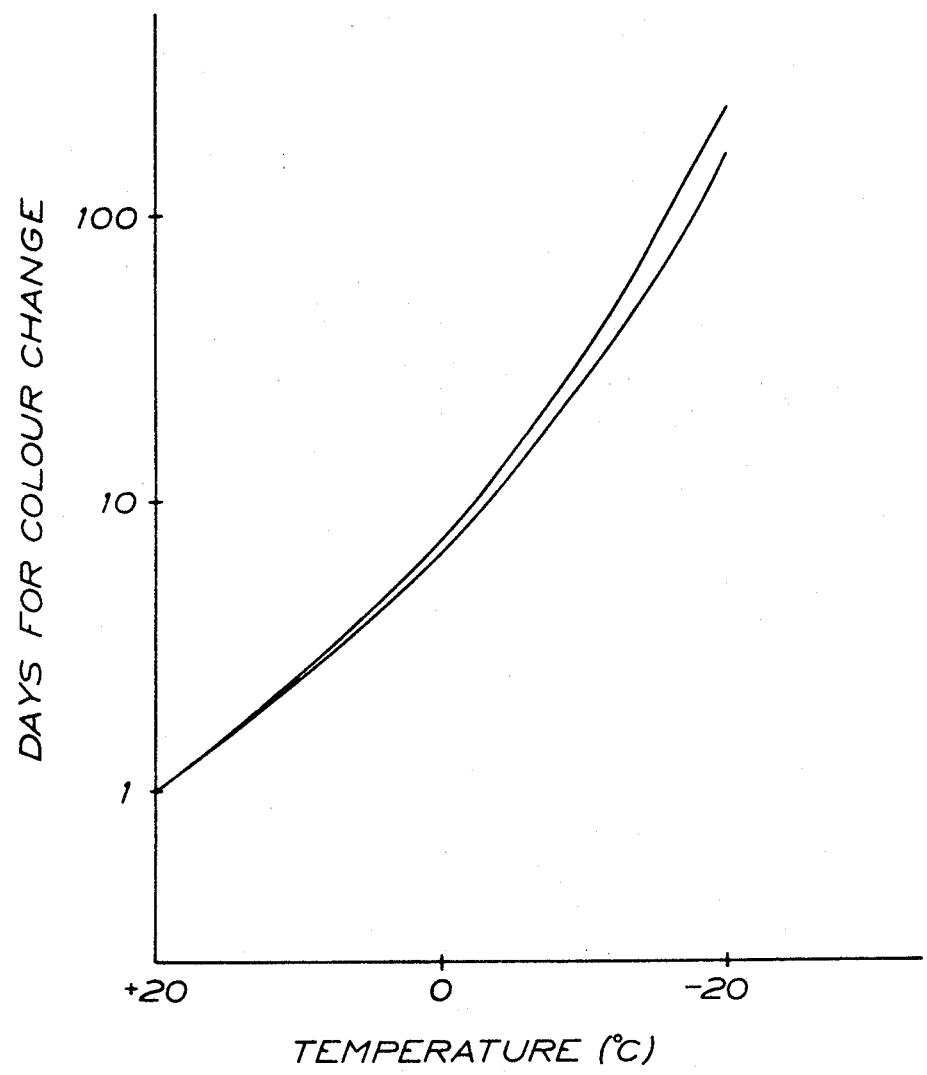

Stellan Ljungberg, Lidingo, and Karl Olof Alm, Vaxjo, Sweden, assignors to Food Control AB, Malmo, Sweden
Continuation-in-part of abandoned application Ser. No. 19,033, Mar. 12, 1970. This application Dec. 17, 1971, Ser. No. 209,232
Claims priority, application Sweden, Mar. 13, 1969, 3,471/69; Denmark, Nov. 12, 1971, 5,553/71
Int. Cl. G01n 31/14
U.S. Cl. 252—408                                11 Claims

ABSTRACT OF THE DISCLOSURE

An enzymatic indicator and a method of making the indicator which comprises the enzyme urease, the substrate urea, a pH-responsive indicating substance, optionally a buffer, and, for changing and adjusting the time-temperature-responsive function of the indicator at low temperatures, glycerol.

---

This application is a continuation-in-part of Ser. No. 19,033, filed Mar. 12, 1970, now abandoned.

This invention relates to an enzymatic indicator for indicating time-temperature courses and a method of making this indicator.

According to the invention, the indicator is primarily for use in conjunction with the storage of food products to indicate prevailing time-temperature conditions, thereby to warn against changes in the food product that may occur as a result of such conditions.

It is well known that perishables, primarily food products, are subject to putrefactive processes by microbial influence. The rate of putrefaction is temperature-responsive and decreases at falling temperature, while putrefaction almost entirely ceases at temperatures below say −18° C. If the temperature rises over −18° C. the putrefactive process proceeds again at a noticeable rate.

Should, e.g., a deep-frozen product be exposed for a longer or shorter time to temperatures higher than say −18° C., for instance at a temporary interruption of the current supply to the freezer, the above mentioned putrefactive process is initiated. If the process is allowed to proceed sufficiently far the product will become unfit for human consumption. If the temperature again sinks below −18° C. the putrefactive process is interrupted.

It should be possible for the person handling the food product readily to check, for instance from the changed appearance thereof, whether the product has been subjected to an unsuitable temperature change and has deteriorated in point of quality. Since, however, a frozen food product does not display any visible differences after it has been subjected to the above mentioned processes it is generally impossible to establish whether or not the product is fit for human consumption.

Earlier, attempts have been made at solving the problems outlined above with the aid of various types of indicators, int. al. enzymatic indicators, which indicate time-temperature courses by changing color. These prior art indicators, however, are associated with various drawbacks and have never been used commercially. For instance, their time-temperature-responsive color changes have not been adapted to what is required in different kinds of food products, i.e. generally about 24 h. at 20° C., about 120 h. at 5° C. and about 4 to 8 months at a maximum of −18° C. This is due to the prior art indicators when suitably adapted to high temperatures give too early a color change at low temperatures and, when suitably adapted to low temperatures, they give too late a color change at high temperatures. In addition, an irreversible decrease of the enzyme activity would seem to be obtained at low temperatures.

According to the present invention, it has been possible to overcome the drawbacks outlined in the foregoing and to provide an indicator which is adapted to the requirements placed particularly on food products. This has been achieved by changing in a specific enzymatic indicator the time-temperature-responsive function of the indicator at low temperatures by addition of glycerol.

The invention thus relates to an enzymatic indicator for indicating time-temperature courses, preferably in conjunction with the storage of food products, said indicator comprising the enzyme urease, the substrate urea, a pH-responsive indicating substance and optionally a buffer, and to change its time-temperature-responsive function at low temperatures the indicator also comprises glycerol.

The invention also relates to a method of making such an indicator by bringing together the indicating substances urease, urea, pH-responsive indicating substance and optionally buffer, and by adding glycerol to the indicating substances.

The mechanism underlying the favorable effect of the glycerol is not entirely known at present, but without being bound to any particular theory it is considered that the glycerol does not only, as might be imagined, act as a substance that lowers the freezing point, but also prevents the activity of the enzyme from being lowered at lower temperatures.

The indicator according to the present invention contains, as mentioned in the foregoing, a specific enzyme, viz. urease, that by acting upon urea forms ammonia and carbon dioxide according to the formula

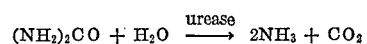

$$(NH_2)_2CO + H_2O \xrightarrow{urease} 2NH_3 + CO_2$$

the reaction product (ammonia) being indicated with a pH indicator.

Examples of pH indicators are meta cresol purple, color change at pH 9.0–7.4 (purple-yellow); phenol red, color change at pH 8.0–6.4 (red-yellow); bromo cresol purple, color change at pH 6.8–5.3 (red-yellow); methyl red, color change at pH 6.3–4.2 (red-yellow); bromo cresol green, color change at pH 5.4–3.8 (blue-yellow); and bromo thymol blue, color change at pH 7.6–6.0 (blue-yellow).

It is possible in a known manner to shift the time-temperature-responsive function of the indicator throughout the entire temperature range by adding buffer solutions of varying capacity so that the time of the indicating changes is altered. Use can also be made of pH indicators having various change intervals.

The indicator according to the invention is placed on or in the vicinity of the food product from the time when the control is to commence, for instance the indicator is fixed to the finished product in conjunction with the manufacture of deep-frozen food products, and then accompanies the food product during the entire time-temperature course to which it is subjected thereafter. At very low temperatures the indicator is inactive, but at temperature increases, for instance to room temperature, the enzymatic process takes place and the resulting reaction product is visually indicated by means of the indicating substance in the form of a color change. The above process being irreversible, that is, it cannot be caused to occur in the other direction, a possible refreezing of the product does not alter a color change of the indicator. In this way it can be decided in a simple, rapid and reliable manner whether or not the food product has been subjected to unsuitable time-temperature conditions, i.e. whether or not it is unfit for human consumption.

For better understanding of the invention, reference is made to the following detailed description of a preferred embodiment of the invention in conjunction with some examples and the accompanying drawing.

The drawing figure schematically shows in diagram form time-temperature curves for indicators having different additions of glycerol. It should be observed that the time axis is logarithmic.

The indicators the time-temperature curves of which are illustrated in the drawing were indicators according to the present invention and had a color change time at 20° C. of 24 h., that is, what applies, as stated above, to the storage of fresh food products at this temperature. This color change time is realized by balancing the enzyme amount and the buffer capacity. To the indicators there had further been added 15 and 20%, respectively, of glycerol, whereby the color change time at low temperatures (−20° C.) amounted to 230 and 160 days, respectively, i.e. what is desirable upon storage of deep-frozen food products.

Experiments were also made with a corresponding indicator which like that indicated above had a color change time at 20° C. of 24 h. but which contained respectively 8.7, 20, 30 and 43.5% glycerol. For this indicator color change times of respectively 400, 250, 160 and 100 days at −20° C. were obtained.

Generally, it has been found that a glycerol content of the indicator of 5–50%, preferably 10–30%, is suitable.

In a preferred embodiment of the invention the indicator comprises two small plastic ampoules and a filter paper strip, which are enclosed in a sealed envelope of plastic. The ampoules are ruptured to activate the indicator. Each ampoule contains 0.07 ml. liquid of the following composition:

(A) 20 weight per volume percent glycerol in a citric acid-phosphate buffer, urease, 30 units per ml., 2% butanol, meta cresol purple (amount required), and distilled water to 0.07 ml.

(B) 20 weight per volume percent glycerol in a citric acid-phosphate buffer, 6% urea, 2% butanol, and distilled water to 0.07 ml.

The citric-acid-phosphate buffer is 0.07 M with regard to citric acid and 0.15 M with regard to disodium phosphate, $Na_2HPO_4 + 2H_2O$.

With an indicator of the above type it is possible to have the glycerol in both A and B or only in A.

Apart from the indicating device mentioned above, the indicator according to the invention may also have the shape of a strip which is applicable to the food product and on which the substances necessary for the indication are provided. Thus, for example, it is possible to provide on a backing comprising a pressure-sensitive adhesive tape a layer containing enzyme, substrate, indicating substance, glycerol and optionally buffer. A transparent protective layer is applied on top of said layer. The indicator can then be kept stored wound into a roll. For use a suitable length of indicating strip is extracted, severed and applied to the food product by means of the pressure-sensitive adhesive tape.

A study of the diagram in the drawing reveals that the ratio of the reaction rate expressed as inclination index, in hot state to that in cold state is approximately 0.4:0.9. This implies that the reaction rate is about 3 times higher per 10° C. at high temperatures than at low temperatures.

It should be observed in this connection that it is important for obtaining reproducible indicating results that use is made of enzymes of uniform and high quality. If not, indicators which otherwise are wholly identical but in which the enzyme derives from different batches at the enzyme manufacture, may give different color change times. This effect of the enzyme may, however, be eliminated by individually calibrating, at the manufacture of the indicator, each series of indicators manufactured with the use of the same batch of enzymes.

It will appear from the foregoing specification that it has been possible by the present invention to provide a new time-temperature indicator which because of its addition of glycerol can be adapted in a unique manner to desired time-temperature conditions, particularly the conditions prevailing at the storage of food products. While the invention has been described with particular reference to the use as a food product indicator, it is not restricted to this use. Other fields may also be concerned, for example the indication of time-temperature conditions at the storage of photographic film, medicines, pharmaceutical products, chemicals and other time-temperature-sensitive compositions.

What we claim and desire to secure by Letters Patent is:

1. An enzymatic indicator for indicating time-temperature courses in conjunction with the storage of sensitive products and compositions, comprising the enzyme urease, the substrate urea, a pH-responsive indicating substance, and glycerol for improving the time-temperature function of the indicator at low temperatures.

2. An enzymatic indicator as in claim 1 further including a citric-acid-phosphate buffer.

3. An indicator as claimed in claim 2 which includes 5–50% glycerol.

4. An indicator as claimed in claim 2 which includes 10–30% glycerol.

5. A method of making an indicator for indicating time-temperature courses in conjunction with the storage of sensitive products and compositions, comprising the step of combining a pH responsive indicating substance with the substances urease, urea and glycerol to form said indicator, said glycerol being effective to improve the time-temperature function of the indicator at low temperatures.

6. A method as in claim 5 wherein a citric acid-phosphate buffer is added to said substances.

7. A method as claimed in claim 5 wherein a total amount of 5–50% glycerol is added.

8. A method as claimed in claim 7, wherein a total amount of 10–30% glycerol is added.

9. A method as claimed in claim 5, wherein before said combining, at least some of said substances are confined in ampoules and wherein said combining is effected by rupturing said ampoules.

10. A method as claimed in claim 9, wherein before said rupturing, said glycerol and said urease are confined in one ampoule and said urea is confined in another ampoule.

11. A method as claimed in claim 9, wherein before said rupturing, said glycerol and urease are confined in one ampoule and said glycerol and urea are confined in another ampoule.

References Cited
UNITED STATES PATENTS

| | | | |
|---|---|---|---|
| 3,523,011 | 8/1970 | Bhiwandker | 23—253 |
| 3,437,070 | 4/1969 | Campbell | 116—114 |

GEORGE F. LESMES, Primary Examiner

W. R. DIXON, JR. Assistant Examiner

U.S. Cl. X.R.

99—192 TT

UNITED STATES PATENT OFFICE
CERTIFICATE OF CORRECTION

Patent No. 3,751,382      Dated August 7, 1973

Inventor(s) S. Ljungbert et al

It is certified that error appears in the above-identified patent and that said Letters Patent are hereby corrected as shown below:

Col. 1, line 71, change "early" to --late--.

Col. 1, line 72, change "late" to --early--.

Signed and sealed this 11th day of June 1974.

(SEAL)
Attest:

EDWARD M. FLETCHER, JR.
Attesting Officer

C. MARSHALL DANN
Commissioner of Patents